US011340579B2

(12) United States Patent
Livescu et al.

(10) Patent No.: US 11,340,579 B2
(45) Date of Patent: May 24, 2022

(54) DOWNHOLE TOOL DIAGNOSTICS AND DATA ANALYSIS

(71) Applicants: Silviu Livescu, Calgary (CA); Diego A. Velez, Calgary (CA); Bennie J. Lindsey, Calgary (CA)

(72) Inventors: Silviu Livescu, Calgary (CA); Diego A. Velez, Calgary (CA); Bennie J. Lindsey, Calgary (CA)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 16/356,969

(22) Filed: Mar. 18, 2019

(65) Prior Publication Data

US 2020/0301393 A1 Sep. 24, 2020

(51) Int. Cl.
*G05B 19/4065* (2006.01)
*G06F 16/909* (2019.01)
*E21B 44/00* (2006.01)

(52) U.S. Cl.
CPC .......... *G05B 19/4065* (2013.01); *E21B 44/00* (2013.01); *G06F 16/909* (2019.01)

(58) Field of Classification Search
CPC .... G05B 19/4065; G06F 16/909; E21B 44/00
USPC ........................................................ 700/174
See application file for complete search history.

(56) References Cited

U.S. PATENT DOCUMENTS

| | | | | |
|---|---|---|---|---|
| 2008/0158004 | A1* | 7/2008 | Latrille | E21B 47/122 340/853.1 |
| 2008/0314582 | A1* | 12/2008 | Belani | G01V 11/00 166/113 |
| 2010/0042327 | A1 | 2/2010 | Garvey et al. | |
| 2010/0114493 | A1* | 5/2010 | Vestal | E21B 41/00 702/9 |
| 2013/0205065 | A1* | 8/2013 | Kloeppner | G06F 12/0868 711/103 |
| 2014/0121973 | A1 | 5/2014 | Buchanan et al. | |

(Continued)

FOREIGN PATENT DOCUMENTS

WO WO-2010019798 A2 * 2/2010 ............. E21B 47/00

OTHER PUBLICATIONS

International Search Report for International Application No. PCT/US2020/023181; International Filing Date Mar. 17, 2020; dated Jul. 8, 2020.

(Continued)

*Primary Examiner* — Jigneshkumar C Patel
(74) *Attorney, Agent, or Firm* — Cantor Colburn LLP (57) ABSTRACT

A system for tool monitoring includes one or more tools of an energy industry system, the one or more tools configured to be disposed in one or more boreholes in one or more resource bearing formations, and one or more sensors connected to each tool of the one or more tools, each sensor of the one or more sensors configured to measure at least one parameter related to performance of each tool of the one or more tools. The system also includes a processing device configured to collect measurements of the at least one parameter from each sensor, generate an individual performance history record for each tool, and store the individual performance history record for each tool in a database configured to store individual performance history records for a plurality of tools in one or more energy industry systems.

18 Claims, 3 Drawing Sheets

(56) References Cited

U.S. PATENT DOCUMENTS

2015/0107901 A1\* 4/2015 Eriksson ................. E21B 41/00
                                                            175/40
2015/0167453 A1\* 6/2015 Forstner ............... E21B 47/022
                                                            702/11
2015/0226013 A1   8/2015 Kirkhope
2017/0058656 A1\* 3/2017 Benson .................. E21B 44/00
2017/0114634 A1\* 4/2017 Yu ........................ E21B 47/113
2018/0348390 A1\* 12/2018 Jones .................... G01V 1/303
2019/0128114 A1\* 5/2019 Bryant ................... E21B 45/00
2019/0203588 A1\* 7/2019 Popp ...................... E21B 47/12

OTHER PUBLICATIONS

Written Opinion for International Application No. PCT/US2020/023181; International Filing Date Mar. 17, 2020; dated Jul. 8, 2020.

\* cited by examiner

DOWNHOLE TOOL DIAGNOSTICS AND DATA ANALYSIS

BACKGROUND

Exploration and production of hydrocarbons require a number of diverse activities from various engineering fields to be performed in a borehole penetrating a resource bearing formation. Typically, exploration involves surveying and performing measurements known as logging using a survey or logging tool. Production generally involves activities such as drilling, installing permanent installations, casing perforation, hydraulic fracturing, formation evaluation, well integrity surveys, well stimulation, production logging, pressure pumping and cement evaluation. Tools disposed downhole are exposed to harsh conditions, including high temperature and pressure conditions, and thus it is desirable to be able to monitor such tools and assess tool performance to improve energy industry operations.

SUMMARY

An embodiment of a system for tool monitoring includes one or more tools of an energy industry system, the one or more tools configured to be disposed in one or more boreholes in one or more resource bearing formations, and one or more sensors connected to each tool of the one or more tools, each sensor of the one or more sensors configured to measure at least one parameter related to performance of each tool of the one or more tools. The system also includes a processing device configured to collect measurements of the at least one parameter from each sensor, generate an individual performance history record for each tool, and store the individual performance history record for each tool in a database configured to store individual performance history records for a plurality of tools in one or more energy industry systems.

An embodiment of a method of tool monitoring includes disposing one or more tools of an energy industry system in one or more boreholes in one or more resource bearing formations, measuring at least one parameter of each tool during an energy industry operation, the parameter related to performance of each tool of the one or more tools. The method also includes collecting measurements of the at least one parameter by a processing device, generating an individual performance history record for each tool, and storing the individual performance history record for each tool in a database configured to store individual performance history records for a plurality of tools in one or more energy industry systems.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Systems, apparatus and methods are provided herein for monitoring and/or performing diagnostics for downhole tools and components. An embodiment of a diagnostic and/or monitoring system includes a processing device, such as a server, downhole processor and/or surface processing unit, which is configured to collect and record performance data for each tool in one or more downhole systems. For example, the processing device can record performance data for each tool in a single downhole system (e.g., a drilling and/or production system) or in multiple downhole systems.

In one embodiment, performance data for each tool is recorded and stored in a global database, which stores a tool performance history for each tool as a data file or other suitable data structure. The database allows for analysis of performance history for individual tools, multiple tools of the same type, individual downhole systems and multiple downhole systems. For example, performance data, such as running time, pressure, temperature, date and time of events and others, can be analyzed via histograms to identify performance trends and opportunities for improvement.

In one embodiment, one or more tools include an internal processing device and a non-volatile memory configured to retain stored performance data (and any other stored data) after power to a respective tool is lost. Upon a power loss or other tool malfunction, the respective tool can be physically retrieved to extract data or a data retrieval tool can be deployed to read stored data. The stored performance data can then be stored in the global database and/or analyzed.

Embodiments described herein provide a number of advantages and technical effects. For example, embodiments provide for the recording and storage of performance data individually for each tool, which allows for analysis of tool performance history. Such analysis can be used to assess the effectiveness of a tool, determine conditions that can affect performance, diagnose tool problems and predict future remaining useful life and unusual or undesirable events. In addition, embodiments provide for the ability of multiple operators in different regions to track the performance of tools in a given system, and to observe and/or analyze the performance of similar tools in various systems and environments.

Figure 1:
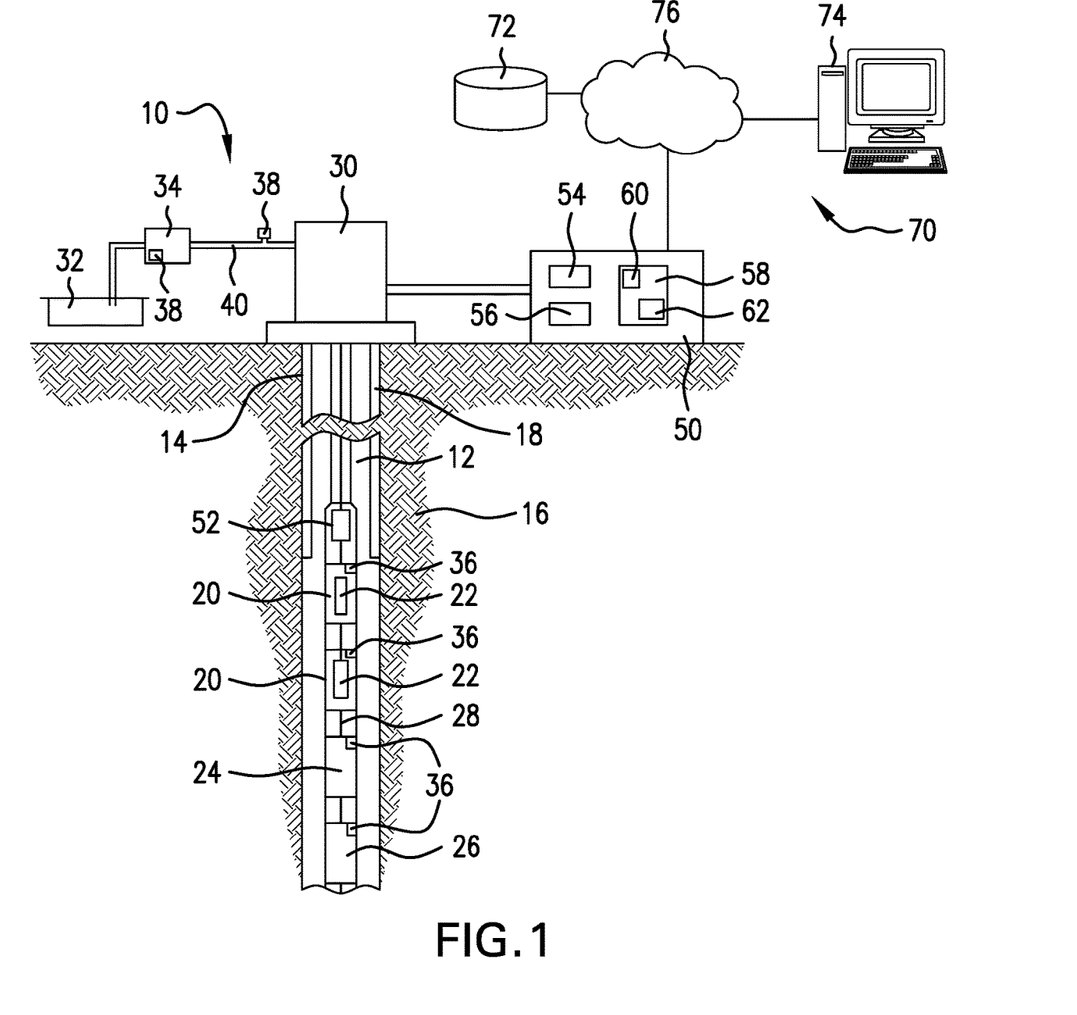
FIG. 1 illustrates a cross-sectional view of an embodiment of a system including a plurality of downhole tools configured to be disposed in a borehole in a subsurface formation.

FIG. 1 illustrates an embodiment of a system 10 for performing energy industry operations such as drilling, formation measurement and/or evaluation, hydrocarbon production, completion and/or stimulation. The system 10 includes a borehole string 12 configured to be deployed in a borehole 14 that that penetrates at least one resource bearing (or potentially resource bearing) formation 16. The borehole 14 may be an open hole, a cased hole or have both open hole and cased hole sections. For example, a length of the borehole 14 can include a casing 18. As described herein, "borehole" or "wellbore" refers to a hole that makes up all or part of a drilled well. It is noted that the borehole 14 may include vertical, deviated and/or horizontal sections, and may follow any suitable or desired path. As described herein, "formations" refer to the various features and materials that may be encountered in a subsurface environment and surround the borehole 14.

In one embodiment, the borehole string 12 is configured as a drill string and/or completion string. For example, the borehole string 12 is a drill string that includes a plurality of pipe sections. It is noted that the borehole string 12 is not so limited and may take any suitable form. Examples of other types of borehole strings include coiled tubing strings and casing-while-drilling strings. It is noted that embodiments described herein are not limited to the number, type and configuration of tools shown in FIG. 1. For example, instead of having multiple tools disposed with the borehole string 12, the system 10 can include one tool with multiple single-point or discrete sensors and/or with one or more distributed sensors (e.g., fiber optic sensors).

Any number of downhole tools or components may be deployed in the borehole. The borehole string 12 includes one or more downhole components or tools configured to perform various functions, such as taking measurements, controlling fluid flow, controlling drilling speed and/or direction, injecting fluid or otherwise stimulating a formation, and others. For example, the one or more downhole tools include one or more logging tools 20. Each logging tool 20 includes a sensing device 22 configured to perform downhole measurements such as temperature, pressure, force, torque, acceleration, tool face, fluid chemistry (e.g., corrosive effect due to $H_2S$, $CO_2$, etc.), flow rate, and others. The sensing device 22 may be configured to emit energy (e.g., acoustic, seismic, electromagnetic, neutron radiation, etc.) into the formation 16 and receive signals due to interaction with the formation 16. Examples of logging tools include resistivity tools, gamma ray or density tools, pulsed neutron tools, acoustic tools, nuclear magnetic resonance tools, seismic data acquisition tools, acoustic impedance tools, formation pressure testing tools, fluid sampling and analysis tools, coring tools and/or any other type of sensor or device capable of providing information regarding a formation, borehole and/or operation. One or more of the logging tools 20 may be configured as logging while drilling (LWD) tools or measurement while drilling (MWD) tools.

Other examples of downhole tools include a stimulation tool 24 configured to perform or facilitate performing a stimulation operation such as a hydraulic fracturing operation, and a flow control device 26 for injecting fluid into the formation 16 and/or receiving fluid from the formation 16. Other types of downhole tools are also contemplated, such as steering devices or systems and directional sensors. Further examples of downhole tools include tools configured for use with coiled tubing, such as motor mills for plug milling, cleanout tools, sleeve shifting tools, extended-reach tools (e.g., tractors and vibratory tools such as fluid-hammer tools), and others. It is noted that the use of the term "tool" is intended to encompass any device or component that can be deployed downhole.

One or more of the downhole tools are configured to communicate with the surface and/or to other component(s) by a communication system. Examples of such communication systems include mud pulse telemetry, electromagnetic telemetry, ultrasonic sound, electrical conductor (e.g., a wireline, wired pipe, cable or wire, optical fiber and others). In one embodiment, the downhole tools 20, 24 and 26 are connected to one another by a bus or other conductor 28. The conductor 28 may include a single conductor that extends along the borehole string 12 to provide power to multiple tools or components arrayed along the string.

In one embodiment, the borehole string 12 and the tools 20, 24 and 26 are connected to a surface assembly 30 that includes, for example, a derrick, a rotary table or top drive, a coiled tubing drum and/or standpipe. During a drilling or other operation, fluid such as drilling mud, is pumped through the surface assembly 30 from a mud pit 32 or other source into the borehole string 12 using one or more pumps 34, and returns to the surface through the borehole 14.

Various sensors may be incorporated in and/or connected to one or more of the downhole tools for measuring parameters and/or conditions related to tool performance. For example, one or more of the tools 20, 24 and 26 includes a monitoring device 36, which includes one or more sensors for performing measurements. Examples of measurements that can be used to monitor and/or analyze tool performance include temperature, pressure, fluid type and chemistry, fluid flow, stress, strain and vibration. For example, each monitoring device 36 may include a temperature sensor, a pressure sensor, an accelerometer, a gravimeter, a fluid content analysis device and/or a strain sensor. In one embodiment, one or more of the above sensors are provided to understand the various forces and conditions that can impact a tool's performance (e.g., force, torque and acceleration). It is noted that any type of tool and any combination of tools (which are not limited by the above examples) may be included for assessing tool performance.

The monitoring device 36 may also include a processor that records running time, and records (e.g., by time and date) the occurrence of various downhole events. Events can include occurrences of excessive temperature (temperature exceeding a threshold value), excessive pressure (pressure exceeding a threshold value), excessive vibration, changes in fluid rate and pressure, and changes in fluid composition indicative of formation fluid entering the borehole 14.

Additional sensors may be disposed at or deployed with the system 10 for controlling aspects of an operation and/or monitoring conditions related to tool performance. For example, sensors 38 are disposed at the pump 34 and/or at a fluid line 40 and/or downhole for measuring properties of fluids (e.g., pressure, temperature, fluid type and chemistry, and/or flow rate) and mechanical properties of tools (e.g., force, torque, acceleration, vibrations, etc.).

In one embodiment, the system 10 includes a processing device such as a surface processing unit 50, which may send and receive data and communications to and from the downhole components. A subsurface processing unit 52 may also be disposed in the borehole 14 and connected to one or more of the downhole components. The surface and/or subsurface processing unit includes at least one processor and suitable electronics that can receive signals and/or data from one or more of the tools 20, 24 and 26, and may also transmit signals and/or data. The surface processing unit 50 may be configured to perform functions such as controlling drilling and steering, transmitting and receiving data, processing measurement data and/or monitoring operations.

The surface processing unit 50, in one embodiment, includes a processor 54, an input/output device 56 and a data storage device (or a computer-readable medium) 58 for storing data, files, models, data analysis modules and/or computer programs. For example, the storage device 58 stores processing modules 60 for performing functions such as collecting data, communicating with downhole components, storing data, and/or performing analysis as described herein. In one embodiment, the data storage device 58 can store data files 62 (or other data structures) of individual performance data for one or more of the tools 20, 24 and 26.

The system 10 includes or is connected to a tool performance data collection and analysis system 70 (also referred to as a tool performance data system 70). The tool performance data system 70 includes at least one processing device that is configured to receive performance data related to each tool 20, 24 and 26, and can also receive performance data for tools in other energy industry systems (e.g., other rig sites).

In one embodiment, the tool performance data system 70 includes a local or global database 72 that stores performance data for each tool 20, 24 and 26, and can also store performance data for tools in multiple rig sites or systems. The database 72 may be local, i.e., connected to a single rig site or system, or may be global, i.e., connected to multiple rig sites or systems at a plurality of locations in a region (e.g., state, country, worldwide, etc.). The global database 72 can receive performance data from, for example, the surface processing unit 50 and/or from other locations, such as the subsurface processing unit 52 and/or from one or more remote processing devices 74, such as one or more computers (e.g., remotely connected desktop or mobile devices), servers and/or processing devices (e.g., surface processing units or controllers) located at other rig sites. The surface processing unit 50, subsurface processing unit 52, the database 72, and/or the one or more remote devices 74 may be connected to a network 76, such as a cloud computing network, a wide area network or the Internet.

In one embodiment, the surface processing unit 50 or other suitable processing device collects performance data for each tool 20, 24 and 26. The processing device can also collect performance data for other tools at other locations and/or in other energy industry systems (e.g., drill rigs, production sites, etc.).

"Performance data" refers to any measurements or other information relevant to the operation of a tool. Such data can include data related to operation of a tool and/or conditions of the environment around the tool. Examples of performance data for a given tool include total running time, occurrence of events, fluid parameters (e.g., fluid type and chemistry, flow rate and/or volume), pressure, temperature, force, torque, and vibration.

Figure 2:
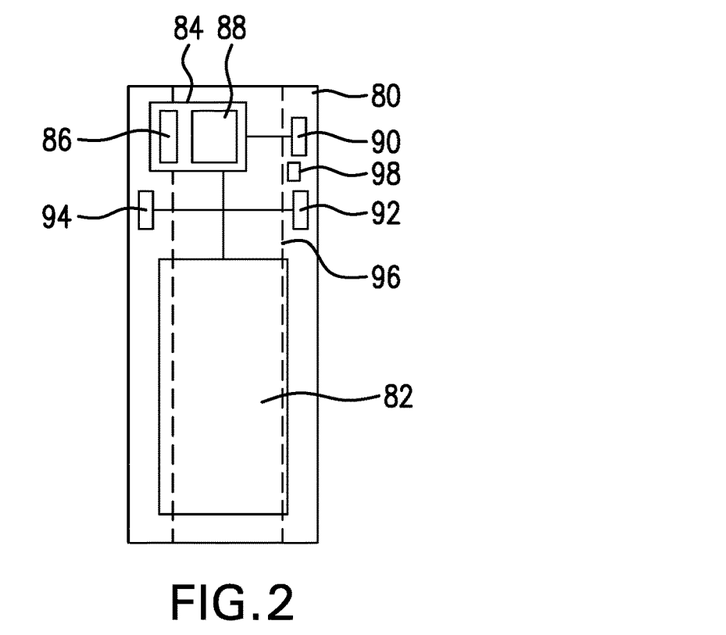
FIG. 2 depicts an embodiment of a downhole tool configured to store tool performance information.

FIG. 2 shows an embodiment of a downhole tool 80, which includes functionality for measuring various tool operating parameters and/or conditions related to tool performance. The tool 80 includes a body that houses a sensing device 82, such as a resistivity or pulsed neutron sensing assembly that can be used to obtain formation measurements. The tool 80 may be configured to perform any suitable function, and is not limited to a measurement device or any of the examples discussed herein.

In this embodiment, the tool 80 includes an internal processing device 84 that has a processor 86 and a memory 88. The tool 80 includes one or more sensors or sensing devices that can take measurements related to tool performance. For example, the tool 80 includes a temperature sensor 90, a pressure sensor 92 and a strain sensor 94. The strain sensor 94 can be used to measure strain on the tool 80 and may also be used to estimate vibration. Although the sensors are shown as discrete sensors, embodiments are not so limited. For example, the one or more sensors or sensing devices may include an optical fiber or multiple optical fibers that extend along the borehole string 12 for distributed sensing.

In one embodiment, the tool memory 88 is a non-volatile memory that can retain stored data if the tool fails or if power to the tool 80 is lost or suspended. An example of such a memory is an internal Electrically Erasable Programmable Read-Only Memory (EEPROM).

In the event of a power and/or communication failure, the tool 80 may be physically retrieved from the tool 80 so that the stored data can be retrieved, analyzed and/or stored in a global database such as the database 72 of FIG. 1. In one embodiment, the tool 80 includes a data connection device such as a data port 98 that can be connected to a data retrieval jig or retrieval tool. For example, the data port 98 is connected to the internal processing device 84 and is disposed proximate to an internal bore or conduit 96. A data retrieval tool can be lowered through the conduit 96 and communicatively connected to the data port 98 in any suitable manner, such as by a physical connection, an inductive connection, a capacitive connection, an electromagnetic connection or other connection.

The tool and/or the data stored therein can be retrieved, for example, to analyze conditions leading up to a failure and provide post-mortem diagnostics.

Figure 3:
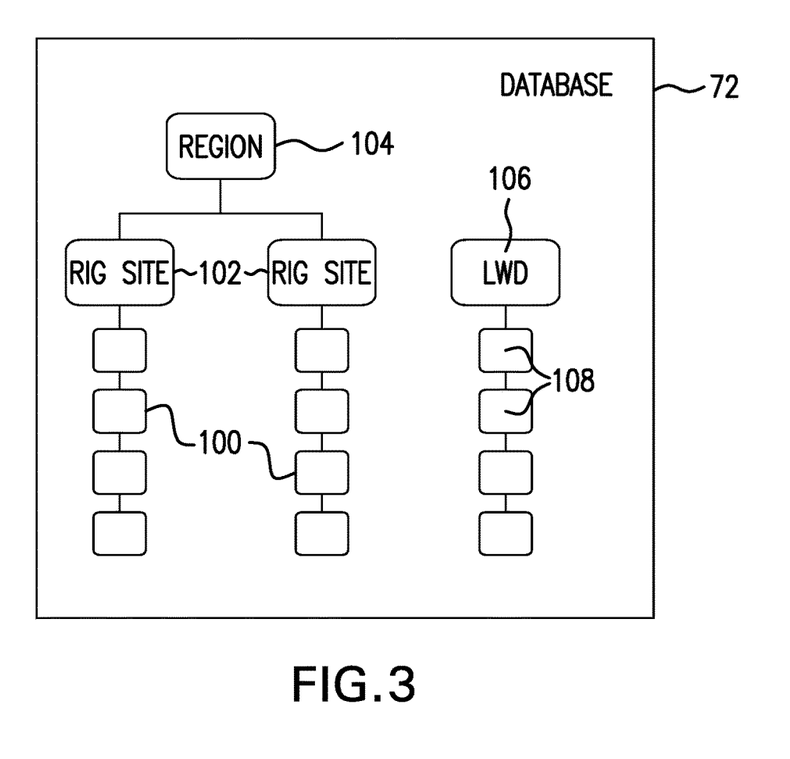
FIG. 3 depicts an example of a data structure of a global database configured to store performance information for a plurality of downhole tools.

FIG. 3 shows an example of a data structure for storing performance data. In this example, performance data for individual tools, system and/or regions is stored in a relational file system, but is not so limited.

In this example, the database 72 (or other suitable storage) stores a hierarchical data structure including individual tool performance history records for each tool (or a subset of tools) at one or more locations. Each data file is shown as a tool performance history file 100.

Each tool performance history file 100 can store data values corresponding to parameter measurements and information related to performance of a respective tool. Such data and information includes, in one embodiment, historical data that indicates total running time, environmental conditions as a function of time (e.g., temperature, pressure, fluid parameters, tool mechanical parameters), and times and dates of performance-related events. The information provides a historical record of tool performance that can be analyzed to assess performance and/or predict future performance and/or future events.

In addition to the various types of performance data discussed above, each tool history file 100 may include a histogram that illustrates tool performance over a tool's running time. For example, a histogram may be generated for each tool, which includes data such as the total running time (e.g., the total number of hours the tool has been in service), temperature range, estimations of vibration and others. The histogram may also include indications of various performance-related events.

An example of an event is a condition in which a measured parameter comes within a selected range of threshold condition or a threshold parameter value associated with a safe operating limit. For example, the time and date, duration and/or frequency of an over-temperature event can be included in the histogram. An over-temperature event is an event in which the temperature of the tool (e.g., measured by the temperature sensor 90) exceeds a safe operating limit or comes within a selected range around the safe operating limit. Other examples of events include environmental anomalies (e.g., ingress of fluid into a tool or into a tool's electronics) and electrical events (e.g., overvoltage conditions or electrical malfunctions).

The database 72 may store history files for multiple tools in a given energy industry system. For example, each tool performance history file 100 for tools in a given rig site is related to a rig site history file 102. In addition, the database can store history files for all tools in selected rig sites (or all rig sites) in a selected geographic region. For example, rig site history files 102 for rig sites in a given region are related to a region history file 104.

Performance data can also be stored in the database 72 and organized using other criteria. For example, performance data for tools of the same type or tools in similar formations can be related to allow for performance analysis.

An example of such an organization is shown in FIG. 3, which includes a LWD history file 106 having individual LWD tool history files 108 related thereto.

It is noted that the above example is provided for illustrative purposes and is not intended to be limiting. The historical data can be stored and organized using any suitable data structure or organizational scheme.

FIG. 3 is a flow chart that illustrates an embodiment of a method 110 that includes tool monitoring, collection of tool performance data and/or diagnostics. In this embodiment, all or part of the method 110 is performed by one or more processing devices in conjunction with a global database, such as the database 72 of FIG. 1. For example, the method 110 may be performed by the surface processing unit 50, either alone or in conjunction with one or more other processing devices, such as one or more tool processors (e.g., the internal processing device 84) and/or a remote processing device such as the remote processing device 74 of FIG. 1. The method 110 includes one or more stages 111-116. In one embodiment, the method 110 includes the execution of all of the stages 111-116 in the order described. However, certain stages may be omitted, stages may be added, or the order of the stages changed.

Figure 4:
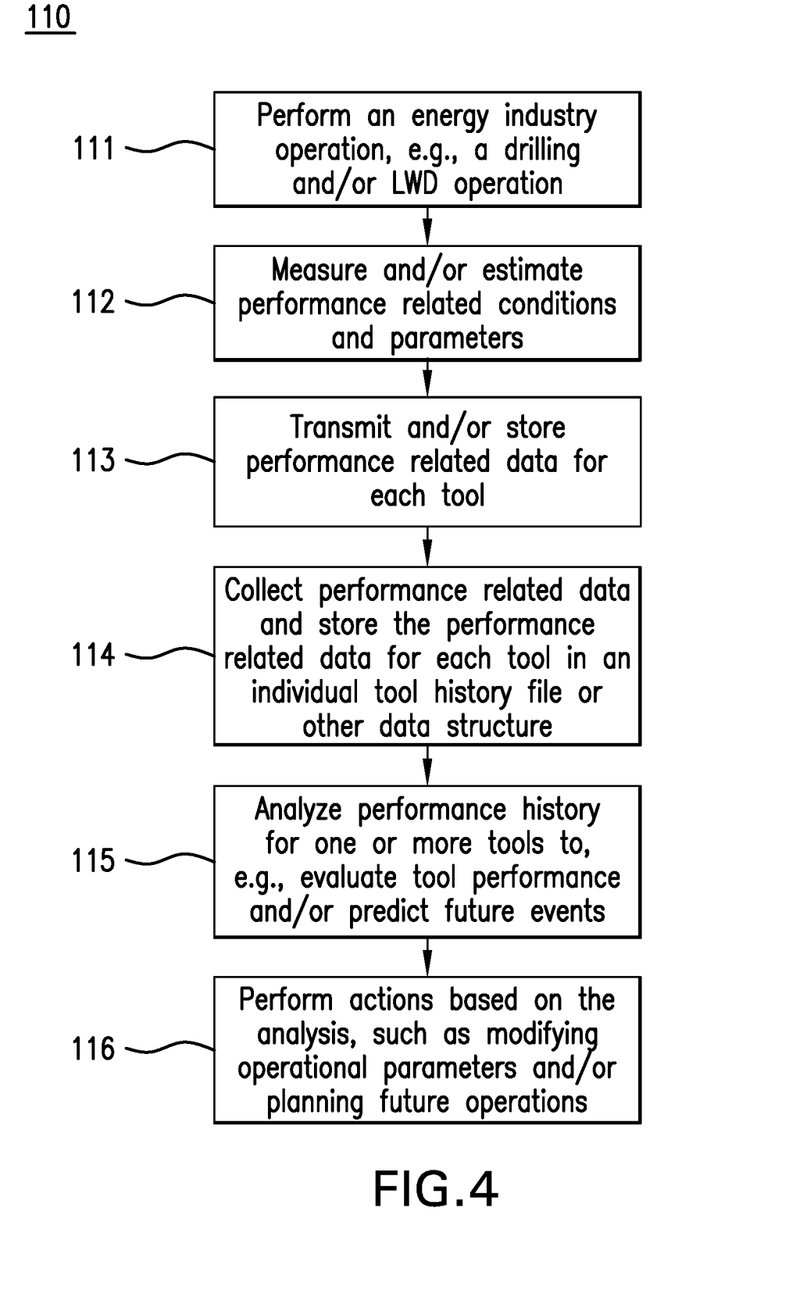
FIG. 4 is a flow chart depicting an embodiment of a method of monitoring downhole tools and/or energy industry systems.

In the first stage 111, an energy industry operation, such as a drilling operation, is performed. Exemplary operations include drilling operations, LWD operations, wireline operations, completion operations, stimulation operations, coiled tubing interventions and others. In one embodiment, the energy industry operation is an LWD operation that includes deploying the borehole string 12 in the borehole 14. Drilling mud and/or other fluids are circulated through the borehole 12 using one or more pumps 34.

In the second stage 112, during the operation, various performance related measurements are performed. For example, sensors in each tool 20, 24 and 26 measure conditions or parameters such as fluid flow, fluid type, temperature, pressure and vibration. Other parameters such as running time are recorded. In one embodiment, the processing device monitors the measurement data to identify and record the occurrence of events such as over-temperature events and over-voltage events.

In the third stage 113, measurement data representing measured parameters is transmitted and/or stored in a selected location. For example, measurement data can be periodically transmitted to the surface processing unit 50 and/or the remote processing device 74. The measurement data may be transmitted and/or stored periodically according to desired schedule, in real time as measurements are performed, and/or in response to an event.

An event may be any change in measurement values associated with an event related to tool operation, changes in downhole conditions or other factors that can have an impact on tool performance. Examples of events include an over-temperature event such as a temperature event identified by temperature values exceeding a threshold (e.g., a safe operating temperature threshold), a number of over-temperature events, a duration of an over-temperature event, and/or a frequency of over-temperature events. Other events may include pressure events (e.g., pressure above a threshold, duration, time frequency of pressure events), vibration events, and others.

Other events can include fault or failure events related to a fault, failure or sub-optimal performance. Examples of such events include a voltage spike, ingress of fluid, and loss of power to a tool.

In one embodiment, measurement data is initially stored in a memory location in a specific tool. The measurement data may then be transmitted to a surface location, e.g., to the surface processing unit 50.

In the fourth stage 114, the measurement data is collected as performance history data for each tool for which measurement data has been collected.

In one embodiment, measurement data collected for each tool is stored in a global database configured to store a performance history record for each tool, and configured to collect performance history data from tools at multiple sites. For example, performance history data is collected from each energy industry system (e.g., rig site) in a selected region. The selected region may be a local area, a selected geographic area or worldwide.

In one embodiment, aspects of the method 110 are performed in response to a tool failure, which can be a loss of communication with the processing device or a loss of power to the tool. In this embodiment, the tool includes a non-volatile memory configured to retain data after a power loss. An example of such a tool is the tool 80 of FIG. 2. In this embodiment, the tool is retrieved to the surface by tripping out the borehole string 12 or retrieving data using a data retrieval tool as discussed above.

In the fifth stage 115, the processing device, either autonomously or in conjunction with a human operator, performs various analyses based on the individual performance history records. For example, histograms and/or other historical performance can be analyzed to estimate tool remaining useful life, predict future events (e.g., over-temperature events) and estimate safe operating limits. Such predications may be based on trend analysis or other statistical analysis to identify trends that can be used to assess tool performance, determine operating parameters that can improve performance, and identify other opportunities for improvement.

In the sixth stage 116, various actions may be performed in response to the predictions and/or other analyses based on the tool history files. For example, the processing device or an operator can adjust operational parameters based on predictions, such as changing fluid pressure, fluid composition, weight on bit and/or rotational speed. Other actions can include using the predictions and/or other analyses to plan future operations.

Set forth below are some embodiments of the foregoing disclosure:

Embodiment 1: A system for tool monitoring, comprising: one or more tools of an energy industry system, the one or more tools configured to be disposed in one or more boreholes in one or more resource bearing formations; one or more sensors connected to each tool of the one or more tools, each sensor of the one or more sensors configured to measure at least one parameter related to performance of each tool of the one or more tools; and a processing device configured to collect measurements of the at least one parameter from each sensor, generate an individual performance history record for each tool, and store the individual performance history record for each tool in a database configured to store individual performance history records for a plurality of tools in one or more energy industry systems.

Embodiment 2: The system of any prior embodiment, wherein the database is a global database configured to store individual performance history records for a plurality of energy industry systems in a selected geographic region.

Embodiment 3: The system of any prior embodiment, wherein the global database is configured to store a regional tool history record that includes a plurality of individual performance history records for tools at a plurality of locations within the geographic region.

Embodiment 4: The system of any prior embodiment, wherein the processing device is configured to identify an event during operation of at least one tool of the one or more tools, wherein the event is identified based on at least one of a measured parameter exceeding a selected threshold, the measured parameter being within a range of the selected threshold, and a rate of change of the measured parameter, wherein the selected threshold and the rate of change correspond to a safe tool operating limit.

Embodiment 5: The system of any prior embodiment, wherein the individual performance history record of the at least one tool includes an indication of each event that occurs during operation of the at least one tool.

Embodiment 6: The system of any prior embodiment, where the processing device is configured to predict a future event or tool operational life based on the measurements of the at least one parameter, the future event including at least one of a tool meeting or approaching a safe operating limit and a tool failure.

Embodiment 7: The system of any prior embodiment, wherein the processing device is configured to modify an operational parameter of an energy industry operation based on the measurements of the at least one parameter.

Embodiment 8: The system of any prior embodiment, wherein at least one tool of the one or more tools includes an internal processing device and a non-volatile memory, the internal processing device configured to store measurements of the at least one parameter for the at least one tool in in the non-volatile memory, the non-volatile memory configured to retain the measured data after loss of power to the at least one tool.

Embodiment 9: The system of any prior embodiment, wherein the at least one tool includes a data connection port configured to connect to a retrieval tool, the retrieval tool configured to be deployed into the borehole and retrieve stored data.

Embodiment 10: The system of any prior embodiment, wherein at least one individual performance history record includes a histogram that includes total running time and a record of one or more events associated with tool performance, the one or more events related to a measurement of the at least one parameter being within a range of a safe operating limit.

Embodiment 11: A method of tool monitoring, comprising: disposing one or more tools of an energy industry system in one or more boreholes in one or more resource bearing formations; measuring at least one parameter of each tool during an energy industry operation, the parameter related to performance of each tool of the one or more tools; collecting measurements of the at least one parameter by a processing device; and generating an individual performance history record for each tool, and storing the individual performance history record for each tool in a database configured to store individual performance history records for a plurality of tools in one or more energy industry systems.

Embodiment 12: The system of any prior embodiment, wherein the database is a global database, the global database configured to store individual performance history records for tools in a plurality of energy industry systems in a selected geographic region.

Embodiment 13: The system of any prior embodiment, wherein the global database is configured to store a regional tool history record that includes a plurality of individual performance history records for tools at a plurality of locations within the geographic region.

Embodiment 14: The system of any prior embodiment, further comprising identifying an event during operation of at least one tool of the one or more tools, wherein the event is identified based on at least one of a measured parameter exceeding a selected threshold, the measured parameter being within a range of the selected threshold, and a rate of change of the measured parameter, wherein the selected threshold and the rate of change correspond to a safe tool operating limit.

Embodiment 15: The system of any prior embodiment, wherein the individual performance history record of the at least one tool includes an indication of each event that occurs during operation of the at least one tool.

Embodiment 16: The system of any prior embodiment, further comprising predicting a future event or tool operational life based on the measurements of the at least one parameter, the future event including at least one of a tool meeting or approaching a safe operating limit and a tool failure.

Embodiment 17: The system of any prior embodiment, further comprising modifying an operational parameter of the energy industry operation based on the measurements of the at least one parameter.

Embodiment 18: The system of any prior embodiment, wherein at least one tool of the one or more tools includes an internal processing device and a non-volatile memory, the method further comprising storing measurements of the at least one parameter for the at least one tool in in the non-volatile memory, the non-volatile memory configured to retain the measured data after loss of power to the at least one tool.

Embodiment 19: The system of any prior embodiment, wherein the at least one tool includes a data connection port configured to connect to a retrieval tool, the retrieval tool configured to be deployed into the borehole and retrieve stored data.

Embodiment 20: The system of any prior embodiment, wherein at least one individual performance history record includes a histogram that includes total running time and a record of one or more events associated with tool performance, the one or more events related to a measurement of the at least one parameter being within a range of a safe operating limit.

In support of the teachings herein, various analysis components may be used, including a digital and/or an analog system. For example, embodiments such as the system 10, downhole tools, hosts and network devices described herein may include digital and/or analog systems. Embodiments may have components such as a processor, storage media, memory, input, output, wired communications link, user interfaces, software programs, signal processors (digital or analog), signal amplifiers, signal attenuators, signal converters and other such components (such as resistors, capacitors, inductors and others) to provide for operation and analyses of the apparatus and methods disclosed herein in any of several manners well-appreciated in the art. It is considered that these teachings may be implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for tool monitoring, comprising:
   a plurality of tools of one or more energy industry systems, the plurality of tools configured to be disposed in one or more boreholes in one or more resource bearing formations;
   one or more sensors connected to each tool of the plurality of tools, each sensor of the one or more sensors configured to measure at least one parameter related to performance of each tool of the plurality of tools, each tool configured to store measurements of the at least one parameter in an individual tool history in a tool memory, the tool memory configured to retain the individual tool history after loss of power to a tool, the individual tool history stored in the tool memory including running time and a record of each performance related event that occurs during operation of the tool, the individual tool history including an indication of each event and a time of each event; and
   a processing device configured to collect the individual tool history from each tool, generate an individual performance history record for each tool based on the individual tool history, and store the individual performance history record for each tool in a database, the database configured to store the individual performance history records in a hierarchical data structure, the hierarchical data structure including a site record for one or more tools in a respective site, and a region record for one or more sites in a respective geographic region, wherein the database is configured to store the individual performance history records based at least on a type of tool and a type of formation, and wherein a tool is configured to, in response to identifying an event during operation of the tool, store a record of the event in the individual tool history.

2. The system of claim 1, wherein the region record includes a plurality of individual performance history records for tools at a plurality of locations within the geographic region.

3. The system of claim 1, wherein the event is identified based on at least one of a measured parameter exceeding a selected threshold, the measured parameter being within a range of the selected threshold, and a rate of change of the measured parameter.

4. The system of claim 3, wherein the selected threshold and the rate of change correspond to a safe tool operating limit.

5. The system of claim 3, where the processing device is configured to predict a future event or tool operational life based on the measurements of the at least one parameter, the future event including at least one of a tool meeting or approaching a safe operating limit and a tool failure.

6. The system of claim 1, wherein the processing device is configured to modify an operational parameter of an energy industry operation based on the measurements of the at least one parameter.

7. The system of claim 1, wherein each tool of the plurality of tools includes an internal processing device and a non-volatile memory, the internal processing device configured to store measurements of the at least one parameter for the at least one tool in the non-volatile memory, the non-volatile memory configured to retain the measured data after loss of power to the at least one tool.

8. The system of claim 7, wherein the at least one tool includes a data connection port configured to connect to a retrieval tool, the retrieval tool configured to be deployed into the borehole and retrieve stored data.

9. The system of claim 1, wherein at least one individual performance history record includes a histogram that includes total running time and a record of one or more events associated with tool performance, the one or more events related to a measurement of the at least one parameter being within a range of a safe operating limit.

10. A method of tool monitoring, comprising:
    disposing a plurality of tools of an energy industry system in one or more boreholes in one or more resource bearing formations;
    measuring at least one parameter of each tool during an energy industry operation, the parameter related to performance of each tool of the one or more tools;
    collecting measurements from each tool of the at least one parameter by a processing device, and storing the measurements from each tool in an individual tool history in a tool memory, the tool memory configured to retain the individual tool history after loss of power to a tool, the individual tool history stored in the tool memory including running time and a record of each performance related event that occurs during operation of the tool, the individual tool history including an indication of each event and a time of each event, and in response to identifying an event during operation of the tool, storing a record of the identified event in the individual tool history; and
    collecting the individual tool history from each tool, generating an individual performance history record for each tool based on the individual tool history, and storing the individual performance history record for each tool in a database, the database configured to store individual performance history records for the plurality of tools in a hierarchical data structure, the hierarchical data structure including a site record for one or more tools in a respective site, and a region record for one or more sites in a respective geographic region, wherein the database is configured to store the individual performance history records based at least on a type of tool and a type of formation.

11. The method of claim 10, wherein the region record includes a plurality of individual performance history records for tools at a plurality of locations within the geographic region.

12. The method of claim 10, wherein storing the record of the identified event is based on at least one of a measured parameter exceeding a selected threshold, the measured parameter being within a range of the selected threshold, and a rate of change of the measured parameter.

13. The method of claim 12, wherein the selected threshold and the rate of change correspond to a safe tool operating limit.

14. The method of claim 12, further comprising predicting a future event or tool operational life based on the measurements of the at least one parameter, the future event including at least one of a tool meeting or approaching a safe operating limit and a tool failure.

15. The method of claim 10, further comprising modifying an operational parameter of the energy industry operation based on the measurements of the at least one parameter.

16. The method of claim 10, wherein at least one tool of the plurality of tools includes an internal processing device and a non-volatile memory, the method further comprising storing measurements of the at least one parameter for the at least one tool in the non-volatile memory, the non-volatile memory configured to retain the measured data after loss of power to the at least one tool.

17. The method of claim 16, wherein the at least one tool includes a data connection port configured to connect to a retrieval tool, the retrieval tool configured to be deployed into the borehole and retrieve stored data.

18. The method of claim 10, wherein at least one individual performance history record includes a histogram that includes total running time and a record of one or more events associated with tool performance, the one or more events related to a measurement of the at least one parameter being within a range of a safe operating limit.

\* \* \* \* \*